United States Patent
Gallagher et al.

(10) Patent No.: US 11,867,195 B2
(45) Date of Patent: Jan. 9, 2024

(54) GAS TURBINE ENGINE AIRFOIL

(71) Applicant: RAYTHEON TECHNOLOGIES CORPORATION, Farmington, CT (US)

(72) Inventors: Edward J. Gallagher, West Hartford, CT (US); Lisa I. Brilliant, Middletown, CT (US); Joseph C. Straccia, Middletown, CT (US); Stanley J. Balamucki, The Villages, FL (US); Mark A. Stephens, Wethersfield, CT (US); Kate Hudon, Superior, CO (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 17/722,449

(22) Filed: Apr. 18, 2022

(65) Prior Publication Data
US 2022/0235792 A1 Jul. 28, 2022

Related U.S. Application Data

(63) Continuation of application No. 16/744,749, filed on Jan. 16, 2020, now Pat. No. 11,408,436, which is a
(Continued)

(51) Int. Cl.
*F04D 29/32* (2006.01)
*F04D 29/54* (2006.01)
(Continued)

(52) U.S. Cl.
CPC ............ *F04D 29/324* (2013.01); *F01D 5/14* (2013.01); *F01D 5/141* (2013.01); *F01D 9/02* (2013.01);
(Continued)

(58) Field of Classification Search
CPC ...... F04D 29/39; F04D 29/384; F04D 29/386; F04D 29/324; F04D 29/325;
(Continued)

(56) References Cited

U.S. PATENT DOCUMENTS 1,220,171 A 3/1917 Berghorn
2,258,792 A 10/1941 New
(Continued)

FOREIGN PATENT DOCUMENTS

DE 1903642 A1 8/1970
DE 102008055824 A1 5/2009
(Continued)

OTHER PUBLICATIONS

About GasTurb. Retrieved Jun. 26, 2018 from: http://gasturb.de/about-gasturb.html.
(Continued)

*Primary Examiner* — Loren C Edwards
(74) *Attorney, Agent, or Firm* — Carlson, Gaskey & Olds, P.C.

(57) ABSTRACT

A gas turbine engine includes a combustor section arranged between a compressor section and a turbine section. The compressor section includes at least a low pressure compressor and a high pressure compressor. The high pressure compressor is arranged upstream of the combustor section. A fan section is included. The low pressure compressor is downstream from the fan section. An airfoil is arranged in the low pressure compressor and includes pressure and suction sides extending in a radial direction from a 0% span position to a 100% span position. The airfoil has an axial stacking offset at a 10% span position that is positive and greater than or equal to an axial stacking offset at the 100% span position. The axial stacking offsets measured relative to an aftward direction.

20 Claims, 4 Drawing Sheets

Related U.S. Application Data continuation of application No. 15/115,360, filed as application No. PCT/US2015/016018 on Feb. 16, 2015, now Pat. No. 10,570,916.

(60) Provisional application No. 61/941,685, filed on Feb. 19, 2014.

(51) Int. Cl.

| | |
|---|---|
| *F01D 5/14* | (2006.01) |
| *F01D 9/02* | (2006.01) |
| *F02C 3/04* | (2006.01) |
| *F02C 7/36* | (2006.01) |
| *F02K 3/06* | (2006.01) |
| *F04D 29/38* | (2006.01) |

(52) U.S. Cl.
CPC .................. *F02C 3/04* (2013.01); *F02C 7/36* (2013.01); *F02K 3/06* (2013.01); *F04D 29/384* (2013.01); *F04D 29/544* (2013.01); *F05D 2220/32* (2013.01); *F05D 2240/35* (2013.01); *F05D 2250/71* (2013.01); *F05D 2260/4031* (2013.01); *Y02T 50/60* (2013.01)

(58) Field of Classification Search
CPC .......... F04D 29/544; F01D 5/14; F01D 5/141; F01D 17/162; F01D 9/02; F02C 3/04; F02C 7/36; F02K 3/06; F02K 3/072; F05D 2220/32; F05D 2220/3217; F05D 2240/35; F05D 2250/38; F05D 2250/70; F05D 2250/71; F05D 2260/4031; Y02T 50/60

See application file for complete search history.

(56) References Cited

U.S. PATENT DOCUMENTS

| | | |
|---|---|---|
| 2,714,499 A | 8/1955 | Warner |
| 2,746,672 A | 5/1956 | Doll, Jr. et al. |
| 2,934,259 A | 4/1960 | Hausmann |
| 2,936,655 A | 5/1960 | Peterson et al. |
| 3,021,731 A | 2/1962 | Stoeckicht |
| 3,194,487 A | 7/1965 | Tyler et al. |
| 3,287,906 A | 11/1966 | McCormick |
| 3,287,960 A | 11/1966 | Abercrombie, Jr. et al. |
| 3,352,178 A | 11/1967 | Lindgren et al. |
| 3,412,560 A | 11/1968 | Gaubatz |
| 3,664,612 A | 5/1972 | Skidmore et al. |
| 3,747,343 A * | 7/1973 | Rosen ................... F02K 3/06 416/245 A |
| 3,754,484 A | 8/1973 | Roberts |
| 3,765,623 A | 10/1973 | Donelson et al. |
| 3,820,719 A | 6/1974 | Clark et al. |
| 3,843,277 A | 10/1974 | Ehrich |
| 3,867,062 A | 2/1975 | Troller |
| 3,892,358 A | 7/1975 | Gisslen |
| 3,905,191 A | 9/1975 | Matto |
| 3,932,058 A | 1/1976 | Harner et al. |
| 3,935,558 A | 1/1976 | Miller et al. |
| 3,988,889 A | 11/1976 | Chamay et al. |
| 4,012,172 A | 3/1977 | Schwaar et al. |
| 4,130,872 A | 12/1978 | Haloff |
| 4,220,171 A | 9/1980 | Ruehr et al. |
| 4,240,250 A | 12/1980 | Harris |
| 4,284,174 A | 8/1981 | Salvana et al. |
| 4,284,388 A | 8/1981 | Szewalski |
| 4,289,360 A | 9/1981 | Zirin |
| 4,431,376 A | 2/1984 | Lubenstein et al. |
| 4,478,551 A | 10/1984 | Honeycutt, Jr. et al. |
| 4,649,114 A | 3/1987 | Miltenburger et al. |
| 4,682,935 A | 7/1987 | Martin |
| 4,696,156 A | 9/1987 | Burr et al. |
| 4,722,357 A | 2/1988 | Wynosky |
| 4,826,400 A | 5/1989 | Gregory |
| 4,900,230 A | 2/1990 | Patel |
| 4,979,362 A | 12/1990 | Vershure, Jr. |
| 5,058,617 A | 10/1991 | Stockman et al. |
| 5,088,892 A | 2/1992 | Weingold et al. |
| 5,102,379 A | 4/1992 | Pagluica et al. |
| 5,141,400 A | 8/1992 | Murphy et al. |
| 5,167,489 A | 12/1992 | Wadia et al. |
| 5,192,190 A | 3/1993 | Ferleger et al. |
| 5,211,703 A | 5/1993 | Ferleger et al. |
| 5,221,181 A | 6/1993 | Ferleger et al. |
| 5,277,549 A | 1/1994 | Chen et al. |
| 5,317,877 A | 6/1994 | Stuart |
| 5,361,580 A | 11/1994 | Ciokajlo et al. |
| 5,433,674 A | 7/1995 | Sheridan et al. |
| 5,443,367 A | 8/1995 | Samit et al. |
| 5,447,411 A | 9/1995 | Curley et al. |
| 5,466,198 A | 11/1995 | McKibbin et al. |
| 5,524,341 A | 6/1996 | Ferleger et al. |
| 5,524,847 A | 6/1996 | Brodell et al. |
| 5,525,038 A | 6/1996 | Sharma et al. |
| 5,624,234 A | 4/1997 | Neely et al. |
| 5,634,767 A | 6/1997 | Dawson |
| 5,642,985 A | 7/1997 | Spear et al. |
| 5,677,060 A | 10/1997 | Terentieva et al. |
| 5,725,354 A | 3/1998 | Wadia et al. |
| 5,778,659 A | 7/1998 | Duesler et al. |
| 5,785,498 A | 7/1998 | Quinn et al. |
| 5,857,836 A | 1/1999 | Stickler et al. |
| 5,915,917 A | 6/1999 | Eveker et al. |
| 5,975,841 A | 11/1999 | Lindemuth et al. |
| 5,985,470 A | 11/1999 | Spitsberg et al. |
| 6,059,532 A | 5/2000 | Chen et al. |
| 6,071,077 A | 6/2000 | Rowlands |
| 6,079,948 A | 6/2000 | Sasaki et al. |
| 6,195,983 B1 | 3/2001 | Wadia et al. |
| 6,223,616 B1 | 5/2001 | Sheridan |
| 6,299,412 B1 | 10/2001 | Wood et al. |
| 6,312,219 B1 | 11/2001 | Wood et al. |
| 6,315,815 B1 | 11/2001 | Spadaccini et al. |
| 6,318,070 B1 | 11/2001 | Rey et al. |
| 6,328,533 B1 | 12/2001 | Decker et al. |
| 6,331,100 B1 * | 12/2001 | Liu ....................... F04D 29/324 416/243 |
| 6,341,942 B1 * | 1/2002 | Chou .................... F01D 5/141 416/228 |
| 6,387,456 B1 | 5/2002 | Eaton, Jr. et al. |
| 6,457,938 B1 | 10/2002 | Liu et al. |
| 6,517,341 B1 | 2/2003 | Brun et al. |
| 6,565,334 B1 | 5/2003 | Bradbury et al. |
| 6,607,165 B1 | 8/2003 | Manteiga et al. |
| 6,709,492 B1 | 3/2004 | Spadaccini et al. |
| 6,814,541 B2 | 11/2004 | Evans et al. |
| 6,883,303 B1 | 4/2005 | Seda |
| 6,899,526 B2 | 5/2005 | Doloresco et al. |
| 6,994,524 B2 | 2/2006 | Owen et al. |
| 7,021,042 B2 | 4/2006 | Law |
| 7,114,911 B2 | 10/2006 | Martin et al. |
| 7,204,676 B2 | 4/2007 | Dutton et al. |
| 7,219,490 B2 | 5/2007 | Dev |
| 7,328,580 B2 | 2/2008 | Lee et al. |
| 7,374,403 B2 | 5/2008 | Decker et al. |
| 7,396,205 B2 | 7/2008 | Dube et al. |
| 7,476,086 B2 | 1/2009 | Wadia et al. |
| 7,497,664 B2 | 3/2009 | Walter et al. |
| 7,547,186 B2 | 6/2009 | Schuster et al. |
| 7,591,754 B2 | 9/2009 | Duong et al. |
| 7,632,064 B2 | 12/2009 | Somanath et al. |
| 7,662,059 B2 | 2/2010 | McCune |
| 7,785,075 B2 | 8/2010 | Botrel et al. |
| 7,806,651 B2 | 10/2010 | Kennepohl et al. |
| 7,806,653 B2 | 10/2010 | Burton et al. |
| 7,824,305 B2 | 11/2010 | Duong et al. |
| 7,828,682 B2 | 11/2010 | Smook |
| 7,926,260 B2 | 4/2011 | Sheridan et al. |
| 7,967,571 B2 | 6/2011 | Wood et al. |
| 7,997,868 B1 | 8/2011 | Liang |
| 7,997,872 B2 | 8/2011 | Wilson |
| 7,997,882 B2 | 8/2011 | Shulver et al. |

(56) References Cited

U.S. PATENT DOCUMENTS

| | | |
|---|---|---|
| 8,087,885 B2 | 1/2012 | Suciu et al. |
| 8,147,207 B2 | 4/2012 | Orosa et al. |
| 8,167,548 B2 | 5/2012 | Greim et al. |
| 8,167,567 B2 | 5/2012 | Kirchner et al. |
| 8,177,496 B2 | 5/2012 | Wilson et al. |
| 8,205,432 B2 | 6/2012 | Sheridan |
| 8,246,292 B1 | 8/2012 | Morin et al. |
| RE43,710 E | 10/2012 | Spear et al. |
| 8,382,438 B2 | 2/2013 | Guemmer |
| 8,393,870 B2 | 3/2013 | Nash et al. |
| 8,464,426 B2 | 6/2013 | Kirchner et al. |
| 8,517,672 B2 | 8/2013 | McCooey |
| 9,140,127 B2 | 9/2015 | Gallagher et al. |
| 9,599,064 B2 | 3/2017 | Gallagher et al. |
| 9,650,896 B2 | 5/2017 | Pesteil et al. |
| 9,790,797 B2 | 10/2017 | Gallagher et al. |
| 10,036,257 B2 | 7/2018 | Gallagher et al. |
| 2002/0141863 A1 | 10/2002 | Liu et al. |
| 2003/0086788 A1 | 5/2003 | Chandraker |
| 2003/0163983 A1 | 9/2003 | Seda et al. |
| 2004/0091353 A1 | 5/2004 | Shahpar et al. |
| 2005/0031454 A1 | 2/2005 | Doloresco et al. |
| 2005/0169761 A1 | 8/2005 | Dube et al. |
| 2005/0254956 A1 | 11/2005 | Dutton et al. |
| 2006/0210395 A1 | 9/2006 | Schuster et al. |
| 2006/0222488 A1 | 10/2006 | Fessou et al. |
| 2006/0228206 A1 | 10/2006 | Decker et al. |
| 2007/0041841 A1 | 2/2007 | Walter et al. |
| 2007/0160478 A1 | 7/2007 | Jarrah et al. |
| 2007/0201983 A1 | 8/2007 | Arinci et al. |
| 2007/0243068 A1 | 10/2007 | Wadia et al. |
| 2008/0003096 A1 | 1/2008 | Kohli et al. |
| 2008/0101959 A1 | 5/2008 | McRae et al. |
| 2008/0107538 A1 | 5/2008 | Bois et al. |
| 2008/0116009 A1 | 5/2008 | Sheridan et al. |
| 2008/0118362 A1 | 5/2008 | Hu et al. |
| 2008/0120839 A1 | 5/2008 | Schilling |
| 2008/0131271 A1 | 6/2008 | Wood et al. |
| 2008/0148564 A1 | 6/2008 | Burton et al. |
| 2008/0226454 A1 | 9/2008 | Decker et al. |
| 2008/0317588 A1 | 12/2008 | Grabowski et al. |
| 2009/0056343 A1 | 3/2009 | Suciu et al. |
| 2009/0226322 A1 | 9/2009 | Clemen |
| 2009/0257866 A1 | 10/2009 | Greim et al. |
| 2009/0274554 A1 | 11/2009 | Guemmer |
| 2009/0297355 A1 | 12/2009 | Herr et al. |
| 2009/0304518 A1 | 12/2009 | Kodama et al. |
| 2009/0314881 A1 | 12/2009 | Suciu et al. |
| 2009/0317227 A1 | 12/2009 | Grover et al. |
| 2010/0054946 A1 | 3/2010 | Orosa et al. |
| 2010/0105516 A1 | 4/2010 | Sheridan et al. |
| 2010/0148396 A1 | 6/2010 | Xie et al. |
| 2010/0162683 A1* | 7/2010 | Grabowski ............ F02K 1/1207 60/226.3 |
| 2010/0212281 A1 | 8/2010 | Sheridan |
| 2010/0215503 A1 | 8/2010 | Myoren et al. |
| 2010/0218483 A1 | 9/2010 | Smith |
| 2010/0232970 A1 | 9/2010 | Murooka et al. |
| 2010/0254797 A1 | 10/2010 | Grover et al. |
| 2010/0260609 A1 | 10/2010 | Wood et al. |
| 2010/0331139 A1 | 12/2010 | McCune |
| 2011/0081252 A1 | 4/2011 | Li |
| 2011/0116917 A1 | 5/2011 | Wang et al. |
| 2011/0135482 A1 | 6/2011 | Nash et al. |
| 2011/0150660 A1 | 6/2011 | Micheli et al. |
| 2011/0159797 A1 | 6/2011 | Beltman et al. |
| 2011/0206498 A1* | 8/2011 | McCooey ................ F16H 1/28 475/348 |
| 2011/0206527 A1 | 8/2011 | Harvey et al. |
| 2011/0225979 A1 | 9/2011 | Hoeger et al. |
| 2011/0268578 A1 | 11/2011 | Praisner et al. |
| 2011/0286850 A1 | 11/2011 | Micheli et al. |
| 2011/0286856 A1 | 11/2011 | Micheli et al. |
| 2011/0293423 A1 | 12/2011 | Bunker et al. |
| 2012/0057982 A1 | 3/2012 | O'Hearn et al. |
| 2012/0124964 A1 | 5/2012 | Hasel et al. |
| 2012/0195767 A1 | 8/2012 | Gervais et al. |
| 2012/0237344 A1 | 9/2012 | Wood et al. |
| 2012/0243975 A1 | 9/2012 | Breeze-Stringfellow et al. |
| 2012/0243983 A1 | 9/2012 | Breeze-Stringfellow et al. |
| 2012/0244005 A1 | 9/2012 | Breeze-Stringfellow et al. |
| 2013/0004297 A1 | 1/2013 | Sheridan |
| 2013/0008170 A1 | 1/2013 | Gallagher et al. |
| 2013/0022473 A1 | 1/2013 | Tran |
| 2013/0089415 A1 | 4/2013 | Brown et al. |
| 2013/0141935 A1 | 6/2013 | Huang |
| 2013/0149108 A1 | 6/2013 | Webster |
| 2013/0164488 A1 | 6/2013 | Wood et al. |
| 2013/0189117 A1 | 7/2013 | Baltas et al. |
| 2013/0192199 A1 | 8/2013 | Merry et al. |
| 2013/0192261 A1 | 8/2013 | Mayer et al. |
| 2013/0192266 A1 | 8/2013 | Houston et al. |
| 2013/0202403 A1 | 8/2013 | Morin et al. |
| 2013/0219859 A1 | 8/2013 | Suciu et al. |
| 2013/0219922 A1 | 8/2013 | Gilson et al. |
| 2013/0224040 A1 | 8/2013 | Straccia |
| 2013/0259668 A1 | 10/2013 | Myoren et al. |
| 2013/0266451 A1 | 10/2013 | Pesteil et al. |
| 2013/0287542 A1 | 10/2013 | Nichols et al. |
| 2013/0315739 A1 | 11/2013 | Cellier et al. |
| 2013/0340406 A1 | 12/2013 | Gallagher et al. |
| 2014/0030060 A1 | 1/2014 | Magowan |
| 2014/0248155 A1 | 9/2014 | Merville et al. |
| 2014/0341749 A1 | 11/2014 | Perrot et al. |
| 2015/0016986 A1 | 1/2015 | Gomez |
| 2015/0017012 A1 | 1/2015 | Pouzadoux et al. |
| 2015/0118059 A1 | 4/2015 | Perrot et al. |
| 2015/0219115 A1 | 8/2015 | Roy et al. |
| 2015/0233252 A1 | 8/2015 | Gallagher et al. |
| 2015/0233323 A1 | 8/2015 | Gallagher et al. |
| 2015/0354363 A1 | 12/2015 | Gallagher et al. |
| 2015/0354367 A1 | 12/2015 | Gallagher et al. |
| 2016/0032728 A1 | 2/2016 | Gallagher et al. |
| 2016/0195104 A1 | 7/2016 | Cellier et al. |
| 2017/0184119 A1 | 6/2017 | Gallagher et al. |
| 2019/0063227 A1 | 2/2019 | Gallagher et al. |

FOREIGN PATENT DOCUMENTS

| | | |
|---|---|---|
| EP | 0082100 A2 | 6/1983 |
| EP | 0251978 A2 | 1/1988 |
| EP | 0661413 A1 | 7/1995 |
| EP | 0745755 A1 | 12/1996 |
| EP | 0774567 A1 | 5/1997 |
| EP | 0791383 A1 | 8/1997 |
| EP | 1074700 A2 | 2/2001 |
| EP | 1098092 A2 | 5/2001 |
| EP | 1106835 A2 | 6/2001 |
| EP | 1106836 A2 | 6/2001 |
| EP | 1111188 A2 | 6/2001 |
| EP | 1142850 A1 | 10/2001 |
| EP | 1505302 A1 | 2/2005 |
| EP | 1508669 A1 | 2/2005 |
| EP | 1524405 A2 | 4/2005 |
| EP | 1582695 A1 | 10/2005 |
| EP | 1939399 A2 | 7/2008 |
| EP | 0801230 B2 | 5/2009 |
| EP | 2075408 A2 | 7/2009 |
| EP | 2133573 A | 12/2009 |
| EP | 2226468 A2 | 9/2010 |
| EP | 1930598 B1 | 8/2012 |
| EP | 2535527 A2 | 12/2012 |
| EP | 2543818 A2 | 1/2013 |
| EP | 2631491 A1 | 8/2013 |
| EP | 2995771 A1 | 3/2016 |
| GB | 1516041 A | 6/1978 |
| GB | 2041090 A | 9/1980 |
| GB | 2170868 A | 8/1986 |
| GB | 2426792 A | 12/2006 |
| GB | 2431697 A | 5/2007 |
| JP | H08165999 A | 6/1996 |
| JP | 2014015858 A | 1/2014 |
| WO | 2007001389 A2 | 1/2007 |
| WO | 2007038674 A1 | 4/2007 |

(56) References Cited

FOREIGN PATENT DOCUMENTS

| WO | 2008109036 | A1 | 9/2008 |
|---|---|---|---|
| WO | 2009103528 | A2 | 8/2009 |
| WO | 2012080669 | A1 | 6/2012 |
| WO | 2013150243 | A1 | 10/2013 |
| WO | 2013158191 | A1 | 10/2013 |
| WO | 2014066503 | A1 | 5/2014 |
| WO | 2015126449 | A1 | 8/2015 |
| WO | 2015126774 | A1 | 8/2015 |

OTHER PUBLICATIONS

Adamson, A.P. (1975). Quiet Clean Short-Haul Experimental Engine (QCSEE) design rationale. Society of Automotive Engineers. Air Transportation Meeting. Hartford, CT. May 6-8, 1975. pp. 1-9.
Aerospace Information Report. (2008). Advanced ducted propulsor in-flight thrust determination. SAE International AIR5450. Aug. 2008. p. 1-392.
Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.
Agma Standard (1997). Design and selection of components for enclosed gear drives. lexandria, VA: American Gear Manufacturers Association. pp. 1-48.
Agma Standard (1999). Flexible couplings—Mass elastic properties and other characteristics. Alexandria, VA: American Gear Manufacturers Association. pp. 1-46.
Agma Standard (2006). Design manual for enclosed epicyclic gear drives. Alexandria, VA: American Gear Manufacturers Association. pp. 1-104.
Ahmad, F. and Mizramoghadam, A.V. (1999). Single v. two stage high pressure turbine design of modern aero engines. ASME. Prestend at the International Gast Turbine & Aeroengine Congress & Exhibition. Indianapolis, Indiana. Jun. 7-10, 1999. pp. 1-9.
Amezketa, M., Iriarte, X., Ros, J., and Pintor, J. (2009). Dynamic model of a helical gear pair with backlash and angle-varying mesh stiffness. Multibody Dynamics 2009, ECCOMAS Thematic Conference. 2009. pp. 1-36.
Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.
Anderson, R.D. (1985). Advanced Propfan Engine Technology (APET) definition study, single and counter-rotation gearbox/pitch change mechanism design. NASA CR-168115. Jul. 1, 1985. pp. 1-289.
Aviadvigatel D-110. Jane's Aero-engines, Aero-engines—Turbofan. Jun. 1, 2010.
Awker, R.W. (1986). Evaluation of propfan propulsion applied to general aviation. NASA CR-175020. Mar. 1, 1986. pp. 1-140.
Baker, R.W. (2000). Membrane technology and applications. New York, NY: McGraw-Hill. pp. 87-153.
Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.
Bornstein, N. (1993). Oxidation of advanced intermetallic compounds. Journal de Physique IV, 1993, 03 (C9), pp. C9-367-C9-373.
Brennan, P.J. and Kroliczek, E.J. (1979). Heat pipe design handbook. Prepared for National Aeronautics and Space Administration by B & K Engineering, Inc. Jun. 1979. pp. 1-348.
Brines, G.L. (1990). The turbofan of tomorrow. Mechanical Engineering: The Journal of the American Society of Mechanical Engineers, 108(8), 65-67.
Bucknell, R.L. (1973). Influence of fuels and lubricants on turbine engine design and performance, fuel and lubircant analyses. Final Technical Report, Mar. 1971-Mar. 1973. pp. 1-252.

Bunker, R.S. (2005). A review of shaped hole turbine film-cooling technology. Journal of Heat Transfer vol. 127. Apr. 2005. pp. 441-453.
Carney, K., Pereira, M. Revilock, and Matheny, P. (2003). Jet engine fan blade containment using two alternate geometries. 4th European LS-DYNA Users Conference. pp. 1-10.
Cheryan, M. (1998). Ultrafiltration and microfiltration handbook. Lancaster, PA: Tecnomic Publishing Company, Inc. pp. 171-236.
Ciepluch, C. (1977). Quiet clean short-haul experimental engine (QCSEE) under-the-wing (UTW) final design report. Prepared for NASA. NASA-CP-134847. Retreived from: https://ntrs.nasa.gov/archive/nasa/casi.ntrs.nasa.gov/19800075257.pdf.
Clarke, D.R. and Levi, C.G. (2003). Materials design for the next generation thermal barrier coatings. Annual. Rev. Mater. Res. vol. 33. 2003. pp. 383-417.
Cramoisi, G. Ed. (2012). Death in the Potomac: The crash of Air Florida Flight 90. Air Crash Investigations. Accident Report NTSB/AAR-82-8. p. 45-47.
Cusick, M. (1981). Avco Lycoming's ALF 502 high bypass fan engine. Society of Automotive Engineers, Inc. Business Aircraft Meeting & Exposition. Wichita, Kansas. Apr. 7-10, 1981. pp. 1-9.
Daggett, D.L., Brown, S.T., and Kawai, R.T. (2003). Ultra-efficient engine diameter study. Nasa/CR-2003-212309. May 2003. pp. 1-52.
Daly, M. Ed. (2008). Jane's Aero-Engine. Issue Twenty-three. Mar. 2008. p. 707-12.
Daly, M. Ed. (2010). Jane's Aero-Engine. Issue Twenty-seven. Mar. 2010. p. 633-636.
Damerau, J. (2014) What is the mesh stiffness of gears? Screen shot of query submitted by Vahid Dabbagh, answered by Dr. Jochan Damerau, Research General Manager at Bosch Corp., Japan. Retrieved from: https://www.researchgate.net/post/What_is_the_mesh_stiffness_of_gears.
Darrah, S. (1987). Jet fuel deoxygenation. Interim Report for Period Mar. 1987-Jul. 1988. pp. 1-22.
Datasheet. CF6-80C2 high-bypass turbofan engines. Retreived from https://geaviation.com/sites/default/files/datasheet-CF6-80C2.pdf.
Datasheet. CFM56-5B for the Airbus A320ceo family and CFM56-7B for the Boeing 737 family. https://www.cfmaeroengines.com/.
Datasheet. Genx™ high bypass turbofan engines. Retreived from: https://www.geaviation.com/sites/default/files/datasheet-genx.pdf.
Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.
Davis, D.G.M. (1973). Variable-pitch fans: Progress in Britain. Flight International. Apr. 19, 1973. pp. 615-617.
Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.
Declaration of Dr. Magdy Attia, In re U.S. Pat. No. 8,313,280, Executed Oct. 21, 2016, pp. 1-88.
Declaration of Dr. Magdy Attia, In re U.S. Pat. No. 8,517,668, Executed Dec. 8, 2016, pp. 1-81.
Declaration of John Eaton, Ph.D. In re United States Patent Application 8,869,568, Executed Mar. 28, 2016, pp. 1-87.
Declaration of Reza Abhari, In re U.S. Pat. No. 8,448,895, Executed Nov. 28, 2016, pp. 1-81.
Declaration of Reza Abhari. In re U.S. Pat. No. 8,695,920, claims 1-4, 7-14, 17 and 19, Executed Nov. 29, 2016, pp. 1-102.
Declaration of Reza Abhari. In re U.S. Pat. No. 8,695,920. Executed Nov. 30, 2016, pp. 1-67.
Declaration of Reza Abhari, Ph.D. In re U.S. Pat. No. 8,844,265, Executed Jun. 28, 2016, pp. 1-91.
Defeo, A. and Kulina, M. (1977). Quiet clean short-haul experimental engine (QCSEE) main reduction gears detailed design final report. Prepared for Nasa. NASA-CR-134872. Jul. 1977. pp. 1-221.
Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.
Drago, R.J. (1974). Heavy-lift helicopter brings up drive ideas. Power Transmission Design. Mar. 1987. pp. 1-15.

(56) References Cited

OTHER PUBLICATIONS

Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.
Dudley, D.W., Ed. (1954). Handbook of practical gear design. Lancaster, PA: Technomic Publishing Company, Inc. pp. 3.96-3.102 and 8.12-8.18.
Dudley, D.W., Ed. (1962). Gear handbook. New York, NY: McGraw-Hill. pp. 14-17 (TOC, Preface, and Index).
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.
Haldenbrand, R. and Norgren, W.M. (1979). Airesearch QCGAT program [quiet clean general aviation turbofan engines]. NASA-CR-159758. pp. 1-199.
Hall, C.A. and Crichton, D. (2007). Engine design studies for a silent aircraft. Journal of Turbomachinery, 129, 479-487.
Han, J., Dutta, S., and Ekkad, S.V. (2000). Gas turbine heat transfer and cooling technology. New York, NY: Taylor & Francis. pp. 1-25, 129-157, and 160-249.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.
Hazlett, R.N. (1991). Thermal oxidation stability of aviation turbine fuels. Philadelphia, PA: ASTM. pp. 1-163.
Heidelberg, L.J., and Hall, D.G. (1992). Acoustic mode measurements in the inlet of a model turbofan using a continuously rotating rake. AIAA-93-0598. 31st Aerospace Sciences Meeting. Reno, NV. Jan. 11-14, 1993. pp. 1-30.
Heidelberg, L.J., and Hall, D.G. (1992). Acoustic mode measurements in the inlet of a model turbofan using a continuously rotating rake. NASA-TM-105989. Prepared for the 31st Aerospace Sciences Meeting. Reno, NV. Jan. 11-14, 1993. pp. 1-30.
Heingartner, P., Mba, D., Brown, D. (2003). Determining power losses in the helical gear mesh; Case Study. ASME 2003 Design Engineering Technical Conferences. Chicago, IL. Sep. 2-6, 2003. pp. 1-7.
Hemighaus, G., Boval, T., Bacha, J., Barnes, F., Franklin, M., Gibbs, L., . . . Morris, J. (2007). Aviation fuels: Techincal review. Chevron Products Company. pp. 1-94. Retrieved from: https://www.cgabusinessdesk.com/document/aviation_tech_review.pdf.
Hendricks, E.S. and Tong, M.T. (2012). Performance and weight estimates for an advanced open rotor engine. NASA/TM-2012-217710. pp. 1-13.
Hess, C. (1998). Pratt & Whitney develops geared turbofan. Flug Revue 43(7). Oct. 1998.
Hill, P.G., Peterson, C.R. (1965). Mechanics and thermodynamics of propulsion. Addison-Wesley Publishing Company, Inc. pp. 307-8.
Hill, P.G., Peterson, C.R. (1992). Mechanics and thermodynamics of propulsion, 2nd Edition. Addison-Wesley Publishing Company, Inc. pp. 400-6.
Holcombe, V. (2003). Aero-Propulsion Technology (APT) task V low noise ADP engine definition study. NASA CR-2003-212521. Oct. 1, 2003. pp. 1-73.
Honeywell Learjet 31 and 35/36 TFE731-2 to 2C Engine Upgrade Program. Sep. 2005. pp. 1-4.
Honeywell LF502. Jane's Aero-engines, Aero-engines—Turbofan. Feb. 9, 2012.
Honeywell LF507. Jane's Aero-engines, Aero-engines—Turbofan. Feb. 9, 2012.
Honeywell Sabreliner 65 TFE731-3 to -3D Engine Upgrade Program. Oct. 2005. pp. 1-4.
Honeywell TFE731. Jane's Aero-engines, Aero-engines- Turbofan. Jul. 18, 2012.
Horikoshi, S. and Serpone, N. (2013). Introduction to nanoparticles. Microwaves in nanoparticle synthesis. Wiley-VCH Verlag GmbH & Co. KGaA. pp. 1-24.
Howe, D.C. and Wynosky, T.A. (1985). Energy efficient engine program advanced turbofan nacelle definition study. NASA CR-174942. May 1, 1985. pp. 174.
Howe, D.C., and Wynosky, T.A. (1985). Energy efficient engine program advanced turbofan nacelle definition study. NASA-CR-174942. May 1985. pp. 1-60.
Howe, D.C., and Wynosky, T.A. (1985). Energy efficient engine program advanced turbofan nacelle definition study. NASA-CR-174942. May 1985. University of Washington dated Dec. 13, 1990. pp. 1-14.
Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.
Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.
Hughes, C. (2010). Geared turbofan technology. NASA Environmentally Responsible Aviation Project. Green Aviation Summit. NASA Ames Research Center. Sep. 8-9, 2010. pp. 1-8.
International Preliminary Report on Patentability for PCT Application No. PCT/US2014/052080, dated Sep. 1, 2016, 10 pages.
International Preliminary Report on Patentability for PCT Application No. PCT/US2014/052282, dated Sep. 1, 2016, 14 pages.
International Preliminary Report on Patentability for PCT Application No. PCT/US2014/052434, dated Sep. 1, 2016, 6 pages.
International Preliminary Report on Patentability for PCT Application No. PCT/US2014/052447, dated Sep. 1, 2016, 7 pages.
International Preliminary Report on Patentability for PCT Application No. PCT/US2014/052516, dated Sep. 1, 2016, 6 pages.
International Preliminary Report on Patentability for PCT Application No. PCT/US2015/015561, dated Sep. 1, 2016, 15 pages.
International Preliminary Report on Patentability for PCT Application No. PCT/US2015/015579, dated Sep. 1, 2016, 13 pages.
International Preliminary Report on Patentability for PCT Application No. PCT/US2015/015586, dated Sep. 1, 2016, 9 pages.
International Preliminary Report on Patentability for PCT Application No. PCT/US2015/016032, dated Sep. 1, 2016, 10 pages.
International Preliminary Report on Patentability for PCT Application No. PCT/US2015/016135, dated Sep. 1, 2016, 10 pages.
International Preliminary Report on Patentability for PCT Application No. PCT/US2015/016554, dated Sep. 1, 2016, 14 pages.
International Search Report and Written Opinion for PCT Application No. PCT/US2014/052080 dated Nov. 28, 2014, 13 pages.
International Search Report and Written Opinion for PCT Application No. PCT/US2014/052096, dated Nov. 28, 2014, 13 pages.
International Search Report and Written Opinion for PCT Application No. PCT/US2014/052238, dated Dec. 11, 2014, 13 pages.
International Search Report and Written Opinion for PCT Application No. PCT/US2014/052282 dated Dec. 5, 2014.
International Search Report and Written Opinion for PCT Application No. PCT/US2014/052293, dated May 29, 2015, 14 pages.
International Search Report and Written Opinion for PCT Application No. PCT/US2014/052325 dated May 29, 2015, 9 pages.
International Search Report and Written Opinion for PCT Application No. PCT/US2014/052434, dated Nov. 27, 2014, 9 pages.
International Search Report and Written Opinion for PCT Application No. PCT/US2014/052437, dated Dec. 26, 2014, 13 pages.
International Search Report and Written Opinion for PCT Application No. PCT/US2014/052440, dated Nov. 27, 2014, 9 pages.
International Search Report and Written Opinion for PCT Application No. PCT/US2014/052441, dated Dec. 12, 2014, 13 pages.
International Search Report and Written Opinion for PCT Application No. PCT/US2014/052447, dated Dec. 8, 2014, 10 pages.
International Search Report and Written Opinion for PCT Application No. PCT/US2014/052468, dated Dec. 12, 2014, 9 pages.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.

(56) References Cited

OTHER PUBLICATIONS

Singh, A. (2005). Application of a system level model to study the planetary load sharing behavior. Jounal of Mechanical Design. vol. 127. May 2005. pp. 469-476.
Singh, B. (1986). Small engine component technology (SECT) study. NASA CR-175079. Mar. 1, 1986. pp. 1-102.
Smith L.H., et al., "Sweep and Dihedral Effects in Axial-Flow Turbomachinery," Journal of Basic Engineering, Sep. 1963, pp. 401-416.
Smith-Boyd, L. and Pike, J. (1986). Expansion of epicyclic gear dynamic analysis program. Prepared for NASA. NASA CR-179563. Aug. 1986. pp. 1-98.
Spadaccini, L.J., and Huang, H. (2002). On-line fuel deoxygenation for coke suppression. ASME, Jun. 2002. pp. 1-7.
Spadaccini, L.J., Sobel, D.R., and Huang, H. (2001). Deposit formation and mitigation in aircraft fuels. Journal of Eng. for Gas Turbine and Power, vol. 123. Oct. 2001. pp. 741-746.
Summons to attend oral proceedings for opposition filed by Safran Aircraft Engines on EP Patent No. 3108117B1 (Application No. 15793112.2) Oct. 29, 2021.
Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.
Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.
Sutliff, D. (2005). Rotating rake turbofan duct mode measurement system. NASA TM-2005-213828. Oct. 1, 2005. pp. 1-34.
Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.
Sweetman, B. and Sutton, O. (1998). Pratt & Whitney's surprise leap. Interavia Business & Technology, 53.621, 0. 25.
Taylor, W.F. (1974). Deposit formation from deoxygenated hydrocarbons. I. General features. Ind. Eng. Chem., Prod. Res. Develop., vol. 13(2). 1974. pp. 133-138.
Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.
Taylor, W.F. and Frankenfeld, J.W. (1978). Deposit fromation from deoxygenated hydrocarbons. 3. Effects of trace nitrogen and oxygen compounds. Ind. Eng. Chem., Prod. Res. Dev., vol. 17(1). 1978. pp. 86-90.
Technical Data. Teflon. WS Hampshire Inc. Retrieved from: http://catalog.wshampshire.com/Asset/psg_teflon_ptfe.pdf.
Technical Report. (1975). Quiet Clean Short-haul Experimental Engine (QCSEE) UTW fan preliminary design. NASA-CR-134842. Feb. 1, 1975. pp. 1-98.
The Jet Engine, Rolls Royce, ISBN 0802121235, 1996.
Thulin, R.D., Howe, D.C., and Singer, I.D. (1982). Energy efficient engine: High pressure turbine detailed design report. Prepared for NASA. NASA CR-165608. Recevied Aug. 9, 1984. pp. 1-178.
Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256.
Tsirlin, M., Pronin, Y.E., Florina, E.K., Mukhametov, S. Kh., Khatsernov, M.A., Yun, H.M., . . . KROKE, E. (2001). Experimental investigation of multifunctional interphase coatings on SiC fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.
Tummers, B. (2006). DataThief III. Retreived from: https://datathief.org/DatathiefManual.pdf pp. 1-52.
Turbomeca Aubisque. Jane's Aero-engines, Aero-engines—Turbofan. Nov. 2, 2009.
Turner, M. G., Norris, A., and Veres, J.P. (2004). High-fidelity three-dimensional simulation of the GE90. NASA/TM-2004-212981. pp. 1-18.

U.S. Department of Transportation: Federal Aviation Administration Advisory Circular, Runway overrun prevention, dated: Nov. 6, 2007, p. 1-8 and Appendix 1 pp. 1-15, Appendix 2 pp. 1-6, Appendix 3 pp. 1-3, and Appendix 4 pp. 1-5.
U.S. Department of Transportation: Federal Aviation Administration Advisory Circular. Standard operating procedures for flight deck crewmembers, Dated: Feb. 27, 2003, p. 1-6 and Appendices.
U.S. Department of Transportation: Federal Aviation Administration Type Certificate Data Sheet No. E6WE. Dated: May 9, 2000. p. 1-9.
Vasudevan, A.K. and Petrovic, J.J. (1992). A comparative overview of molybedenum disilicide composites. Materials Science and Engineering, A155, 1992. pp. 1-17.
Waters, M.H. and Schairer, E.T. (1977). Analysis of turbofan propulsion system weight and dimensions. NASA Technical Memorandum. Jan. 1977. pp. 1-65.
Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.
Wendus, B.E., Stark, D.F., Holler, R.P., and Funkhouse, M.E. (2003). Follow-on technology requirement study for advanced subsonic transport. Technical Report prepared for Nasa. NASA/CR-2003-212467. Aug. 1, 2003. pp. 1-47.
Whitaker, R. (1982). ALF 502: plugging the turbofan gap. Flight International, p. 237-241, Jan. 30, 1982.
Wie, Y.S., Collier, F.S., Wagner, R.D., Viken, J.K., and Pfenniger, W. (1992). Design of a hybrid laminar flow control engine nacelle. AIAA-92-0400. 30th Aerospace Sciences Meeting & Exhibit. Jan. 6-9, 1992. pp. 1-14.
Wikipedia. Stiffness. Retrieved Jun. 28, 2018 from: https://en.wikipedia.org/wiki/Stiffness.
Wikipedia. Torsion spring. Retreived Jun. 29, 2018 from: https://en.wikipedia.org/wiki/Torsion_spring.
Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.
Willis, W.S. (1979). Quiet clean short-haul experimental engine (QCSEE) final report. NASA/CR-159473 pp. 1-289.
Winn, A. (Ed). (1990). Wide Chord Fan Club. Flight International, 4217(137). May 23-29, 1990. pp. 34-38.
Wright, G.H. and Russell, J.G. (1990). The M.45SD-02 variable pitch geared fan engine demonstrator test and evaluation experience. Aeronautical Journal., vol. 84(836). Sep. 1980. pp. 268-277.
Written Submission before Oral Proceedings in European Patent Application No. 15793112.2 by Safran Aircraft Engines dated Mar. 18, 2022. [with English translation].
Xie, M. (2008). Intelligent engine systems: Smart case system. NASA/CR-2008-215233. pp. 1-31.
Xu, Y., Cheng, L., Zhang, L., Ying, H., and Zhou, W. (1999). Oxidation behavior and mechanical properties of C/SiC composites with Si-MoSi2 oxidation protection coating. J. of Mat. Sci. vol. 34. 1999. pp. 6009-6014.
Zalud, T. (1998). Gears put a new spin on turbofan performance. Machine Design, 70(20), p. 104.
Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.
Zhao, J.C. and Westbrook, J.H. (2003). Ultrahigh-temperature materials for jet engines. MRS Bulletin. vol. 28(9). Sep. 2003. pp. 622-630.
Liebeck, R.H., Andrastek, D.A., Chau, J., Girvin, R., Lyon, R., Rawdon, B.K., Scott, P.W et al. (1995). Advanced subsonic airplane design & economics studies. NASA CR-195443. Apr. 1995. pp. 1-187.
Lord, W.K., Macmartin, D.G., and Tillman, T.G. (2000). Flow control opportunities in gas turbine engines. American Institute of Aeronautics and Astronautics. pp. 1-15.
Lynwander, P. (1983). Gear drive systems: Design and application. New York, New York: Marcel Dekker, Inc. pp. 145, 355-358.

(56) References Cited

OTHER PUBLICATIONS

MacIsaac, B. and Langston, R. (2011). Gas turbine propulsion systems. Chichester, West Sussex: John Wiley & Sons, Ltd. pp. 260-265.

Mancuso, J.R. and Corcoran, J.P. (2003). What are the differences in high performance flexible couplings for turbomachinery? Proceedings of the Thirty-Second Turbomachinery Symposium. 2003. pp. 189-207.

Manual. Student's Guide to Learning SolidWorks Software. Dassault Systemes—SolidWorks Corporation. pp. 1-156.

Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.

Mattingly, J.D. (1996). Elements of gas turbine propulsion. New York, New York: McGraw-Hill, Inc. pp. 1-18, 60-62, 223-234, 462-479, 517-520, 757-767, and 862-864.

Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 668-670, 673-675, 682-685, 697-705, 726-727, 731-732, 802-805, 828-830 and appendices.

Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 673-675, 682-685, 697-699, 703-705, 802-805, 862-864, and 923-925.

Mattingly, J.D. (1996). Elements of gas turbine propulsion. New York, New York: McGraw-Hill, Inc. pp. 8-15.

McArdle, J.G. and Moore, A.S. (1979). Static test-stand performance of the YF-102 turobfan engine with several exhaust configurations for the Quiet Short-Haul Research Aircraft (QSRA). Prepared for Nasa. NASA-TP-1556. Nov. 1979. pp. 1-68.

McCune, M.E. (1993). Initial test results of 40,000 horsepower fan drive gear system for advanced ducted propulsion systems. AIAA 29th Joint Conference and Exhibit. Jun. 28-30, 1993. pp. 1-10.

McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.

Meier N. (2005) Civil Turbojet/Turbofan Specifications. Retrieved from http://jet-engine.net/civtfspec.html.

Merriam-Webster's collegiate dictionary, 10th Ed. (2001). p. 1125-1126.

Merriam-Webster's collegiate dictionary, 11th Ed. (2009). p. 824.

Metzger F.B., et al., "Analytical parametric investigation of low pressure ration fan noise," NASA-CR-2188, Mar. 1973, pp. 1-119.

Meyer, A.G. (1988). Transmission development of TEXTRON Lycoming's geared fan engine. Technical Paper. Oct. 1988. pp. 1-12.

Middleton, P. (1971). 614: VFW's jet feederliner. Flight International, Nov. 4, 1971. p. 725, 729-732.

Moxon, J. How to save fuel in tomorrow's engines. Flight International. Jul. 30, 1983. 3873(124). pp. 272-273.

Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.

Nanocor Technical Data for Epoxy Nanocomposites using Nanomer 1.30E Nanoclay. Nnacor, Inc. Oct. 2004.

NASA Conference Publication. (1978). CTOL transport technology. NASA-CP-2036-PT-1. Jun. 1, 1978. pp. 1-531.

NASA Conference Publication. Quiet, powered-lift propulsion. Cleveland, Ohio. Nov. 14-15, 1978. pp. 1-420.

Newton, F.C., Liebeck, R.H., Mitchell, G.H., Mooiweer, M.A., Platte, M.M., Toogood, T.L., and Wright, R.A. (1986). Multiple Application Propfan Study (MAPS): Advanced tactical transport. NASA CR-175003. Mar. 1, 1986. pp. 1-101.

Norton, M. and Karczub, D. (2003). Fundamentals of noise and vibration analysis for engineers. Press Syndicate of the University of Cambridge. New York: New York. p. 524.

Oates, G.C. (Ed). (1989). Aircraft propulsion systems and technology and design. Washington, D.C.: American Institute of Aeronautics, Inc. pp. 341-344.

Opposition filed by Safran Aircraft Engines on EP Patent No. 3108117B1 (Application No. 15793112.2) Nov. 9, 2020. [with English translation].

Oyama et al., "Multiobjective Optimization of a Multi-Stage Compressor Using Evolutionary Algorithm", NASA, 2002, HIAA 2002-3535, pp. 1-11.

Parker, R.G. and Lin, J. (2001). Modeling, modal properties, and mesh stiffness variation instabilities of planetary gears. Prepared for NASA. NASA/CR-2001-210939. May 2001. pp. 1-111.

Partial European Search Report for Application No. EP15793193.2, dated Feb. 8, 2017, 9 pages.

Petrovic, J.J., Castro, R.G., Vaidya, R.U., Peters, M.I., Mendoza, D., Hoover, R.C., and Gallegos, D. E. (2001). Molybdenum disilicide materials for glass melting sensor sheaths. Ceramic Engineering and Science Proceedings. vol. 22(3). 2001. pp. 59-64.

Press release. The GE90 engine. Retreived from: https://www.geaviation.com/commercial/engines/ge90-engine; https://www.geaviation.com/press-release/ge90-engine-family/ge90-115b-fan-completing-blade-testing-schedule-first-engine-test; and https://www.geaviation.com/press-release/ge90-engine-family/ge'scomposite-fan-blade-revolution-turns-20-years-old.

Product Brochure. Garrett TFE731. Allied Signal. Copyright 1987. pp. 1-24.

Pyrograf-III Carbon Nanofiber. Product guide. Retrieved Dec. 1, 2015 from: http://pyrografproducts.com/Merchant5/merchant.mvc?Screen=cp_nanofiber.

Ramsden, J.M. (Ed). (1978). The new European airliner. Flight International, 113(3590). Jan. 7, 1978. pp. 39-43.

Ratna, D. (2009). Handbook of thermoset resins. Shawbury, UK: iSmithers. pp. 187-216.

Reshotko, M., Karchmer, A., Penko, P.F. (1977). Core noise measurements on a YF-102 turbofan engine. NASA TM X-73587. Prepared for Aerospace Sciences Meeting sponsored by the American Institute of Aeronautics and Astronautics. Jan. 24-26, 2977.

Reynolds, C.N. (1985). Advanced prop-fan engine technology (APET) single- and counter-rotation gearbox/pitch change mechanism. Prepared for NASA. NASA CR-168114 (vol. I). Jul. 1985. pp. 1-295.

Riegler, C., and Bichlmaier, C. (2007). The geared turbofan technology—Opportunities, challenges and readiness status. Porceedings CEAS. Sep. 10-13, 2007. Berlin, Germany. pp. 1-12.

Rogalsky T., et al., "An aerodynamic design technique for optimizing fan blade spacing", Proceedings of the 7th Annual Conference of the Computational Fluid Dynamics Society of Canada, 1999, 6 pages.

Rolls-Royce M45H. Jane's Aero-engines, Aero-engines—Turbofan. Feb. 24, 2010.

Roux, E. (2007). Turbofan and turbojet engines database handbook. Editions Elodie Roux. Blagnac: France. pp. 1-595.

Salemme, C.T. and Murphy, G.C. (1979). Metal spar/superhybrid shell composite fan blades. Prepared for NASA. NASA-CR-159594. Aug. 1979. pp. 1-127.

Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.

Schaefer, J.W., Sagerser, D.R., and Stakolich, E.G. (1977). Dynamics of high-bypass-engine thrust reversal using a variable-pitch fan. Technical Report prepared for NASA. NASA-TM-X-3524. May 1, 1977. pp. 1-33.

Seader, J.D. and Henley, E.J. (1998). Separation process principles. New York, NY: John Wiley & Sons, Inc. pp. 722-726 and 764-771.

Shah, D.M. (1992). MoSi2 and other silicides as high temperature structural materials. Superalloys 1992. The Minerals, Metals, & Materials Society pp. 409-422.

Shorter Oxford English Dictionary, 6th Edition. (2007). vol. 2, N-Z, pp. 1888.

(56) References Cited

OTHER PUBLICATIONS

International Search Report and Written Opinion for PCT Application No. PCT/US2014/052474, dated on Dec. 5, 2014, 14 pages.
International Search Report and Written Opinion for PCT Application No. PCT/US2014/052516, dated Jun. 10, 2015, 9 pages.
International Search Report and Written Opinion for PCT Application No. PCT/US2015/015554, dated May 21, 2015, 14 pages.
International Search Report and Written Opinion for PCT Application No. PCT/US2015/015561, dated on Nov. 24, 2015, 18 pages.
International Search Report and Written Opinion for PCT Application No. PCT/US2015/015575 dated Nov. 24, 2015.
International Search Report and Written Opinion for PCT Application No. PCT/US2015/015579 dated on Nov. 24, 2015.
International Search Report and Written Opinion for PCT Application No. PCT/US2015/015586 dated on Nov. 24, 2015.
International Search Report and Written Opinion for PCT Application No. PCT/US2015/016011 dated May 21, 2015.
International Search Report and Written Opinion for PCT Application No. PCT/US2015/016018 dated on Nov. 24, 2015.
International Search Report and Written Opinion for PCT Application No. PCT/US2015/016032 dated on Nov. 24, 2015.
International Search Report and Written Opinion for PCT Application No. PCT/US2015/016078 dated May 29, 2015.
International Search Report and Written Opinion for PCT Application No. PCT/US2015/016083, dated Jul. 21, 2015, 13 pages.
International Search Report and Written Opinion for PCT Application No. PCT/US2015/016086, dated May 26, 2015, 14 pages.
International Search Report and Written Opinion for PCT Application No. PCT/US2015/016091, dated on Nov. 24, 2015, 15 pages.
International Search Report and Written Opinion for PCT Application No. PCT/US2015/016135 dated on Nov. 24, 2015.
International Search Report and Written Opinion for PCT Application No. PCT/US2015/016154, dated May 22, 2015, 17 pages.
International Search Report and Written Opinion for PCT Application No. PCT/US2015/016187 dated May 20, 2015.
International Search Report and Written Opinion for PCT Application No. PCT/US2015/016378, dated May 29, 2015, 10 pages.
International Search Report and Written Opinion for PCT Application No. PCT/US2015/016554, dated May 26, 2015, 17 pages.
International Search Report and Written Opinion for PCT Application No. PCT/US2015/016584 dated on Nov. 24, 2015.
Ivchenko-Progress AI-727M. Jane's Aero-engines, Aero-engines—Turbofan. Nov. 27, 2011.
Ivchenko-Progress D-436. Jane's Aero-engines, Aero-engines—Turbofan. Feb. 8, 2012.
Ivchenko-Progress D-727. Jane's Aero-engines, Aero-engines—Turbofan. Feb. 7, 2007.
Jacobson, N.S. (1993). Corrosion of silicon-based ceramics in combustion environments. J. Am. Ceram. Soc. 76(1). pp. 3-28.
Jeng, Y.- L., Lavernia, E.J. (1994). Processing of molybdenum disilicide. J. of Mat. Sci. vol. 29. 1994. pp.2557-2571.
Johnston, R.P. and Hemsworth, M.C. (1978). Energy efficient engine preliminary design and integration studies. Jun. 1, 1978. pp. 1-28.
Johnston, R.P., Hirschkron, R., Koch, C.C., Neitzel, R.E., and Vinson, P.W. (1978). Energy efficient engine: Preliminary design and integration study—final report. NASA CR-135444. Sep. 1978. pp. 1-401.
Jorgensen, P.J., Wadsworth, M.E., and Cutler, I.B. (1961). Effects of water vapor on oxidation of silicon carbide. J. Am. Ceram. Soc. 44(6). pp. 248-261.
Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.
Kandebo, S.W. (1998). Geared-Turbofan engine design targets cost, complexity. Aviation Week & Space Technology, 148(8). p. 34-5.
Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.
Kasuba, R. and August, R. (1984). Gear mesh stiffness and load sharing in planetary gearing. American Society of Mechanical Engineers, Design Engineering Technical Conference, Cambridge, MA. Oct. 7-10, 1984. pp. 1-6.
Kerrebrock, J.L. (1977). Aircraft engines and gas turbines. Cambridge, MA: The MIT Press. p. 11.
Knip, Jr., G. (1987). Analysis of an advanced technology subsonic turbofan incorporating revolutionary materials. NASA Technical Memorandum. May 1987. pp. 1-23.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press. p. 465.
Krantz, T.L. (1990). Experimental and analytical evaluation of efficiency of helicopter planetary stage. NASA Technical Paper. Nov. 1990. pp. 1-19.
Krenkel, W., Naslain, R., and Schneider, H. Eds. (2001). High temperature ceramic matrix composites pp. 224-229. Weinheim, DE: Wiley-VCH Verlag GmbH.
Kurzke, J. (2001). GasTurb 9: A program to calculate design and off-design performance of gas turbines. Retrieved from: https://www.scribd.com/document/92384867/GasTurb9Manual.
Kurzke, J. (2012). GasTurb 12: Design and off-design performance of gas turbines. Retrieved from: https://www.scribd.com/document/153900429/GasTurb-12.
Kurzke, J. (2008). Preliminary Design, Aero-engine design: From state of the art turbofans towards innovative architectures. pp. 1-72.
Kurzke, J. (2009). Fundamental differences between conventional and geared turbofans. Proceedings of ASME Turbo Expo: Power for Land, Sea, and Air. 2009, Orlando, Florida. pp. 145-153.
Langston, L. and Faghri, A. Heat pipe turbine vane cooling. Prepared for Advanced Turbine Systems Annual Program Review. Morgantown, West Virginia. Oct. 17-19, 1995. pp. 3-9.
Lau, K., Gu, C., and Hui, D. (2005). A critical review on nanotube and nanotube/nanoclay related polymer composite materials. Composites: Part B 37(2006) 425-436.
Leckie, F.A. and Dal Bello, D.J. (2009). Strength and stiffness of engineering systems. Mechanical Engineering Series. Springer. pp. 1-10, 48-51.
Leckie F.A., et al., "Strength and Stiffness of Engineering Systems," Mechanical Engineering Series, Springer, 2009, pp. 1-3.
Lee, K.N. (2000). Current status of environmental barrier coatings for Si-Based ceramics. Surface and Coatings Technology 133-134, 2000. pp. 1-7.
Levintan, R.M. (1975). Q-Fan demonstrator engine. Journal of Aircraft. vol. 12( 8). Aug. 1975. pp. 658-663.
Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.
Dudley, D.W., Ed. (1962). Gear handbook. New York, NY: McGraw-Hill. pp. 3.14-3.18 and 12.7-12.21.
Dudley, D.W., Ed. (1994). Practical gear design. New York, NY: McGraw-Hill. pp. 119-124.
Edkins, D.P., Hirschkron, R., and Lee, R. (1972). TF34 turbofan quiet engine study. Final Report prepared for NASA. NASA-CR-120914. Jan. 1, 1972. pp. 1-99.
Edwards, T. and Zabarnick, S. (1993). Supercritical fuel deposition mechanisms. Ind. Eng. Chem. Res. vol. 32. 1993. pp. 3117-3122.
El-Sayad, A.F. (2008). Aircraft propulsion and gas turbine engines. Boca Raton, FL: CRC Press. pp. 215-219 and 355-360.
Engine Specifications, Engine Alliance GP7200—The engine for the A380, Retrieved Feb. 19, 2015 from http://www.enginealliance.com/engine_specifications.html, 1 page.
European Office Action for Application No. EP15752593.2, dated Sep. 9, 2019, 7 pages.
European Search Report for Application No. EP14883036.7, dated Feb. 13, 2017, 10 pages.
European Search Report for Application No. EP14883117.5, dated Jan. 23, 2017, 8 pages.

(56) References Cited

OTHER PUBLICATIONS

European Search Report for Application No. EP14883154.8, dated Jan. 24, 2017, 8 pages.
European Search Report for Application No. EP14883170.4, dated Apr. 19, 2018, 5 pages.
European Search Report for Application No. EP14883515.0, dated Feb. 9, 2017, 8 pages.
European Search Report for Application No. EP15751454.8, dated Feb. 3, 2017, 7 pages.
European Search Report for Application No. EP15751498.5, dated Jan. 30, 2017, 8 pages.
European Search Report for Application No. EP15751738.4, dated Feb. 13, 2017, 9 pages.
European Search Report for Application No. EP15752124.6, dated Jan. 30, 2017, 8 pages.
European Search Report for Application No. EP15752432.3, dated Jan. 24, 2017, 9 pages.
European Search Report for Application No. EP15752593.2, dated Feb. 13, 2017, 7 pages.
European Search Report for Application No. EP15752887.8, dated Feb. 9, 2017, 8 pages.
European Search Report for Application No. EP15792194.1, dated Feb. 13, 2017, 7 pages.
European Search Report for Application No. EP15793112.2, dated Feb. 22, 2017, 7 pages.
European Search Report for Application No. EP15793268.2, dated Feb. 20, 2017, 7 pages.
European Search Report for Application No. EP15793323.5, dated Feb. 3, 2017, 7 pages.
European Search Report for Application No. EP15793425.8, dated Jan. 26, 2017, 8 pages.
European Search Report for Application No. EP15796827.2, dated Feb. 3, 2017, 7 pages.
Extended European Search Report for Application No. EP14882896.5, dated Oct. 19, 2017, 8 pages.
Extended European Search Report for Application No. EP14883503.6, dated Nov. 6, 2017, 9 pages.
Extended European Search Report for Application No. EP15751617.0, dated Dec. 5, 2017, 5 pages.
Extended European Search Report for Application No. EP15752013.1, dated Dec. 5, 2017, 6 pages.
Extended European Search Report for Application No. EP15792720.3, dated Oct. 17, 2017, 14pgs.
Extended European Search Report for Application No. EP15792720.3, dated Jan. 31, 2018, 14 pages.
Extended European Search Report for Application No. EP15793127.0, dated Dec. 1, 2017, 5 pages.
Extended European Search report for Application No. EP15793193.2, dated May 12, 2017, 14 pages.
Faghri, A. (1995). Heat pipe and science technology. Washington, D.C.: Taylor & Francis. pp. 1-60.
Falchetti, F., Quiniou, H., and Verdier, L. (1994). Aerodynamic design and 3D Navier-Stokes analysis of a high specific flow fan. ASME. Presented at the International Gas Turbine and Aeroengine Congress and Exposition. The Hague, Netherlands. Jun. 13-16, 1994. pp. 1-10.
File History for United States U.S. Appl. No. 12/131,876.
Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.
Frankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.
Gates, D. Bombardier flies at higher market. Seattle Times. Jul. 13, 2008. pp. C6.
Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992. pp. 147-158.
Glassman A.J. (Ed.)., "Turbine Design and Application," vol. two, NASA SP-290, 1973, pp. 1-148.
Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.
Gliebe, P.R., Ho, P.Y., and Mani, R. (1995). UHB engine fan and broadband noise reduction study. NASA CR-198357. Jun. 1995. pp. 1-48.
Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Gray, D.E. (1978). Energy efficient engine preliminary design and integration studies. Prepared for NASA. NASA CR-135396. Nov. 1978. pp. 1-366.
Gray, D.E. and Gardner, W.B. (1983). Energy efficient engine program technology benefit/cost study—vol. 2. NASA CR-174766. Oct. 1983. pp. 1-118.
Griffiths, B. (2005). Composite fan blade containment case. Modern Machine Shop. Retrieved from: http://www.mmsonline.com/articles/composite-fan-blade-containment-case pp. 1-4.
Groweneweg, J.F. (1994). Fan noise research at NASA. NASA-TM-106512. Prepared for the 1994 National Conference on Noise Control Engineering. Fort Lauderdale, FL. May 1-4, 1994. pp. 1-10.
Groweneweg, J.F. (1994). Fan noise research at NASA. Noise-CON 94. Fort Lauderdale, FL. May 1-4, 1994. pp. 1-10.
Gunston, B. (Ed.) (2000). Jane's aero-engines, Issue seven. Coulsdon, Surrey, UK: Jane's Information Group imited. pp. 510-512.
Dudley, D.W., Ed. (1962). Gear handbook. New York, NY: McGraw-Hill. pp. 3-1-3-44, 14-1-14-60, and 15-1-15-21 (TOC, Preface, and Index).

* cited by examiner

GAS TURBINE ENGINE AIRFOIL

CROSS-REFERENCE TO RELATED APPLICATIONS

This application is a continuation of U.S. application Ser. No. 16/744,749 filed Jan. 16, 2020, which is a continuation of U.S. application Ser. No. 15/115,360 filed Jul. 29, 2016, which is a 371 of International Application No. PCT/US2015/016018 filed Feb. 16, 2015, which claims priority to U.S. Provisional Application No. 61/941,685, which was filed on Feb. 19, 2014 and is incorporated herein by reference.

BACKGROUND

This disclosure relates to gas turbine engine airfoils. More particularly, the disclosure relates to airfoil axial stacking offset in, for example, a gas turbine engine compressor.

A turbine engine such as a gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes at least low and high pressure compressors, and the turbine section includes at least low and high pressure turbines.

Direct drive gas turbine engines include a fan section that is driven directly by one of the turbine shafts. Rotor blades in the fan section and a low pressure compressor of the compressor section of direct drive engines rotate in the same direction.

Gas turbine engines have been proposed in which a geared architecture is arranged between the fan section and at least some turbines in the turbine section. The geared architecture enables the associated compressor of the compressor section to be driven at much higher rotational speeds, improving overall efficiency of the engine. The propulsive efficiency of a gas turbine engine depends on many different factors, such as the design of the engine and the resulting performance debits on the fan that propels the engine and the compressor section downstream from the fan. Physical interaction between the fan and the air causes downstream turbulence and further losses. Although some basic principles behind such losses are understood, identifying and changing appropriate design factors to reduce such losses for a given engine architecture has proven to be a complex and elusive task.

Prior compressor airfoil geometries may not be suitable for the compressor section of gas turbine engines using a geared architecture, since the significantly different speeds of the compressor changes the desired aerodynamics of the airfoils within the compressor section. Counter-rotating fan and compressor blades, which may be used in geared architecture engines, also present design challenges.

SUMMARY

In one exemplary embodiment, a compressor airfoil of a turbine engine having a geared architecture includes pressure and suction sides that extend in a radial direction from a 0% span position to a 100% span position. The airfoil has a relationship between an axial stacking offset and span position that includes a curve with a negative slope from 90% span to 100% span. The negative slope leans forward relative to an engine axis.

In a further embodiment of the above, the curve has a negative slope from 80% span to 100% span.

In a further embodiment of any of the above, the curve has a negative slope from 70% span to 100% span.

In a further embodiment of any of the above, the curve has a positive slope beginning at 0% span. The positive slope leans aftward relative to the engine axis.

In a further embodiment of any of the above, the positive slope extends from 0% span to 40% span.

In a further embodiment of any of the above, the curve transitions from the positive slope to the negative slope in a range of 40% span to 75% span.

In another exemplary embodiment, a gas turbine engine includes a combustor section that is arranged between a compressor section and a turbine section. A fan section has an array of twenty-six or fewer fan blades. The fan section has a fan pressure ratio of less than 1.55. A geared architecture couples the fan section to the turbine section or the compressor section. An airfoil is arranged in the compressor section and includes pressure and suction sides that extend in a radial direction from a 0% span position to a 100% span position. The airfoil has a relationship between an axial stacking offset and span position that includes a curve with a negative slope from 90% span to 100% span. The negative slope leans forward relative to an engine axis.

In a further embodiment of any of the above, the compressor section includes at least a low pressure compressor and a high pressure compressor. The high pressure compressor is arranged immediately upstream of the combustor section.

In a further embodiment of any of the above, the airfoil is provided in a compressor outside the high pressure compressor.

In a further embodiment of any of the above, the low pressure compressor is counter-rotating relative to the fan blades.

In a further embodiment of any of the above, the gas turbine engine is a two-spool configuration.

In a further embodiment of any of the above, the low pressure compressor is immediately downstream from the fan section.

In a further embodiment of any of the above, the airfoil is rotatable relative to an engine static structure.

In a further embodiment of any of the above, the curve has a negative slope from 80% span to 100% span.

In a further embodiment of any of the above, the curve has a negative slope from 70% span to 100% span.

In a further embodiment of any of the above, the curve has a positive slope beginning at 0% span. The positive slope leans aftward relative to the engine axis.

In a further embodiment of any of the above, the positive slope extends from 0% span to 40% span.

In a further embodiment of any of the above, the curve transitions from the positive slope to the negative slope in a range of 40% span to 75% span.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
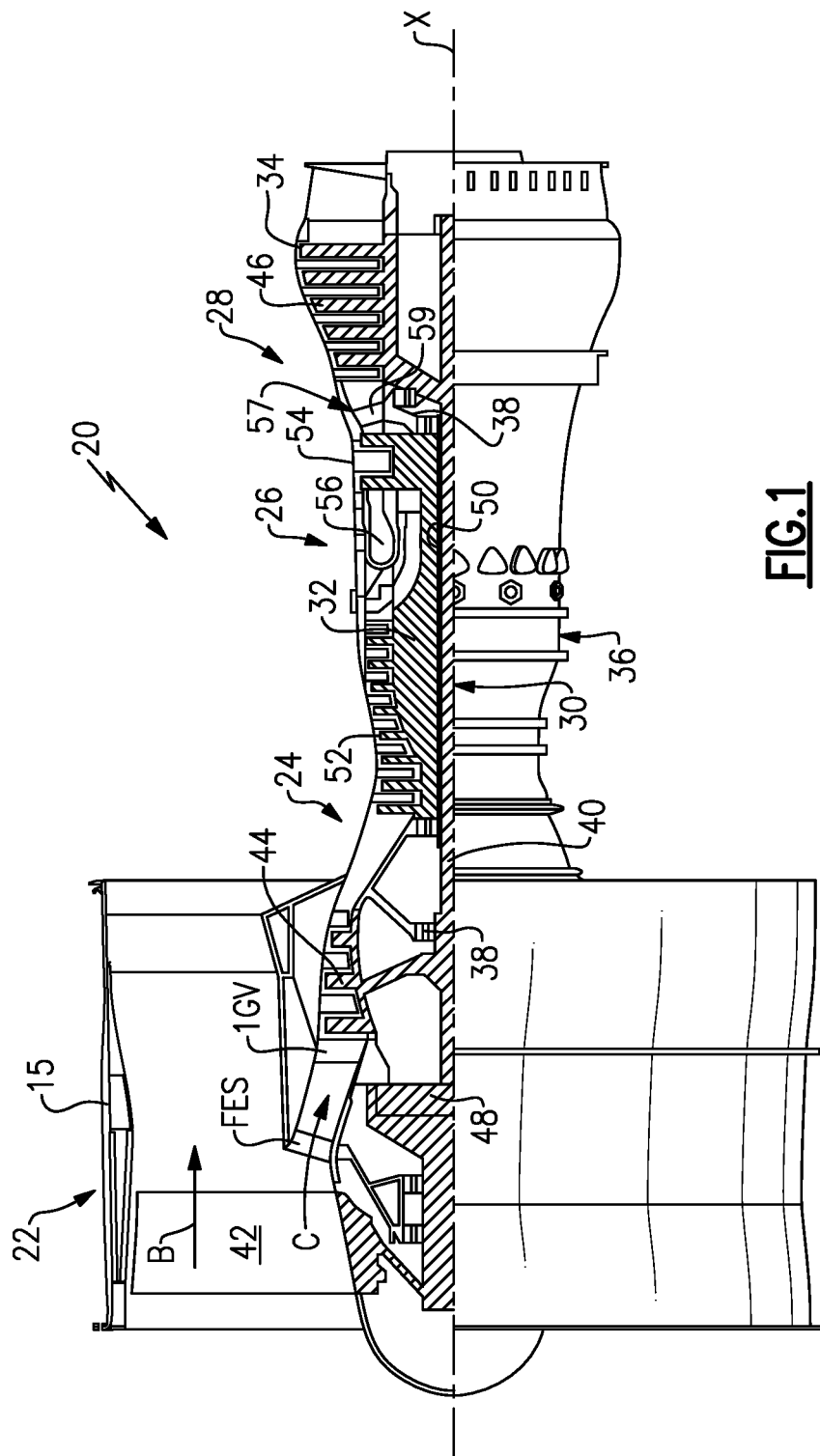
FIG. 1 schematically illustrates a gas turbine engine embodiment with a geared architecture.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. That is, the disclosed airfoils may be used for engine configurations such as, for example, direct fan drives, or two- or three-spool engines with a speed change mechanism coupling the fan with a compressor or a turbine sections.

The exemplary engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis X which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicyclic gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.55. In another non-limiting embodiment the low fan pressure ratio is less than about 1.45. In another non-limiting embodiment the low fan pressure ratio is from 1.1 to 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1200 ft/second (365.7 meters/second).

Figure 2:
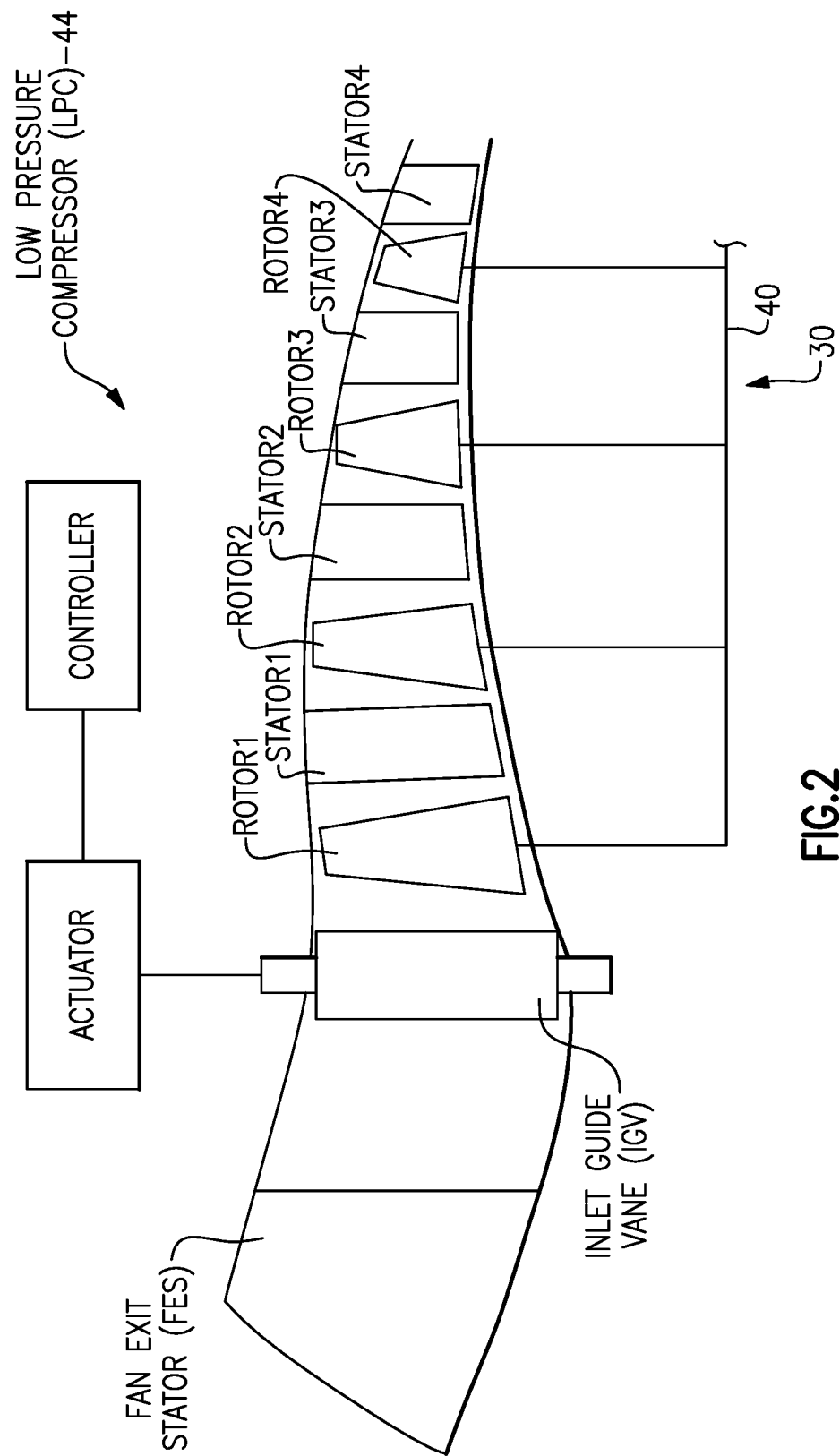
FIG. 2 schematically illustrates a low pressure compressor section of the gas turbine engine of FIG. 1.

Referring to FIG. 2, which schematically illustrates an example low pressure compressor (LPC) 44, a variable inlet guide vane (IGV) is arranged downstream from a fan exit stator (FES). The figure is highly schematic, and the geometry and orientation of various features may be other than shown. An actuator driven by a controller actuates the IGV about their respective axes. Multiple airfoils are arranged downstream from the IGV. The airfoils include alternating stages of rotors (ROTOR1, ROTOR2, ROTOR3, ROTOR4) and stators (STATOR1, STATOR2, STATOR3, STATOR4). In the example shown in FIG. 2, the LPC includes four rotors alternating with four stators. However, in another example, a different number of rotors and a different number of stators may be used. Moreover, the IGV and stator stages may all be variable, fixed or a combination thereof.

The disclosed airfoils may be used in a low pressure compressor of a two spool engine or in portions of other compressor configurations, such as low, intermediate and/or high pressure areas of a three spool engine. However, it should be understood that any of the disclosed airfoils may be used for blades or vanes, and in any of the compressor section, turbine section and fan section.

Figure 3:
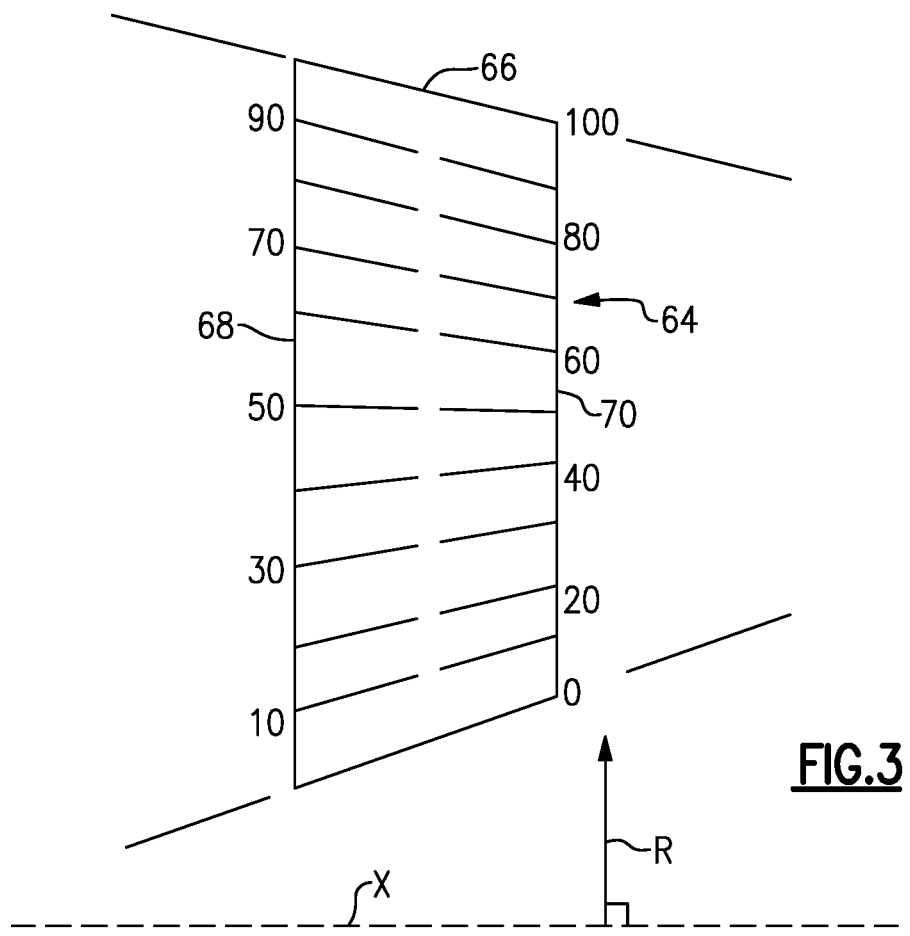
FIG. 3 is a schematic view of airfoil span positions.

Referring to FIG. 3, span positions on an airfoil 64 are schematically illustrated from 0% to 100% in 10% increments. Each section at a given span position is provided by a conical cut that corresponds to the shape of the core flow path, as shown by the large dashed lines. In the case of an airfoil with an integral platform, the 0% span position corresponds to the radially innermost location where the airfoil meets the fillet joining the airfoil to the inner platform. In the case of an airfoil without an integral platform, the 0% span position corresponds to the radially innermost location where the discrete platform meets the exterior surface of the airfoil. For airfoils having no outer platform, such as blades, the 100% span position corresponds to the tip 66. For airfoils having no platform at the inner diameter, such as cantilevered stators, the 0% span position corresponds to the inner diameter location of the airfoil. For stators, the 100% span position corresponds to the outermost location where the airfoil meets the fillet joining the airfoil to the outer platform.

Figure 4:
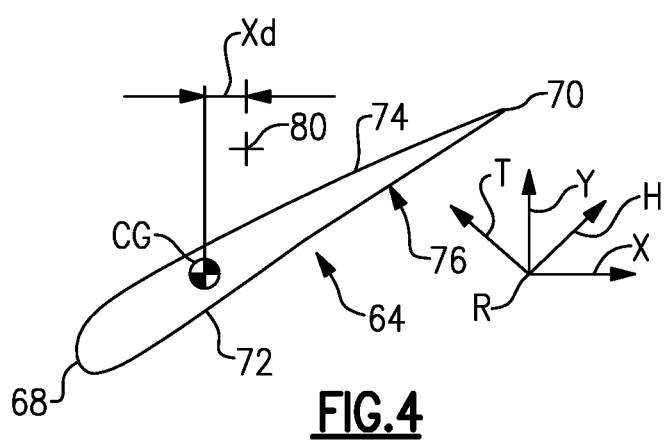
FIG. 4 is a schematic view of a cross-section of an airfoil sectioned at a particular span position and depicting directional indicators.

Airfoils in each stage of the LPC are specifically designed radially from an inner airfoil location (0% span) to an outer airfoil location (100% span) and along circumferentially opposite pressure and suction sides 72, 74 extending in chord between a leading and trailing edges 68, 70 (see FIG. 4). Each airfoil is specifically twisted with a corresponding stagger angle and bent with specific sweep and/or dihedral angles along the airfoil. Airfoil geometric shapes, stacking offsets, chord profiles, stagger angles, sweep and dihedral angles, among other associated features, are incorporated individually or collectively to improve characteristics such as aerodynamic efficiency, structural integrity, and vibration mitigation, for example, in a gas turbine engine with a geared architecture in view of the higher LPC rotational speeds.

The airfoil 64 has an exterior surface 76 providing a contour that extends from a leading edge 68 generally aftward in a chord-wise direction H to a trailing edge 70, as shown in FIG. 4. Pressure and suction sides 72, 74 join one another at the leading and trailing edges 68, 70 and are spaced apart from one another in an airfoil thickness direction T. An array of airfoils 64 are positioned about the axis X (corresponding to an X direction) in a circumferential or tangential direction Y. Any suitable number of airfoils may be used for a particular stage in a given engine application.

An axial stacking offset $X_d$ corresponds to the location of the center of gravity $X_{CG}$ for a particular section at a given span location relative to a reference point 80 in the X direction. The reference point 80 is a location such as the axial center of the root or the axial center of a rotor bore, for example. The value $X_d$ corresponds to the axial distance from the reference point 80 to the center of gravity. A positive X is on the aft side of reference point 80, and a negative X is on the forward side of the reference point 80. A positive slope to the axial stacking offset profile is where the span section leans aftward, and a negative slope to the axial stacking offset profile is where the span section leans forward relative to the engine's axis X.

The exterior surface 76 of the airfoil 64 generates lift based upon its geometry and directs flow along the core flow path C. The airfoil 64 may be constructed from a composite material, or an aluminum alloy or titanium alloy, or a combination of one or more of these. Abrasion-resistant coatings or other protective coatings may be applied to the airfoil. The rotor stages may be constructed as an integrally bladed rotor, if desired, or discrete blades having roots secured within corresponding rotor slots of a disc. The stators may be provided by individual vanes, clusters of vanes, or a full ring of vanes.

Airfoil geometries can be described with respect to various parameters provided. The disclosed graph(s) illustrate the relationships between the referenced parameters within 10% of the desired values, which correspond to a hot aerodynamic design point for the airfoil. In another example, the referenced parameters are within 5% of the desired values, and in another example, the reference parameters are within 2% of the desired values. It should be understood that the airfoils may be oriented differently than depicted, depending on the rotational direction of the blades. The signs (positive or negative) used, if any, in the graphs of this disclosure are controlling and the drawings should then be understood as a schematic representation of one example airfoil if inconsistent with the graphs. The signs in this disclosure, including any graphs, comply with the "right hand rule." The axial stacking offset varies with position along the span, and varies between a hot, running condition and a cold, static ("on the bench") condition.

The geared architecture 48 of the disclosed example permits the fan 42 to be driven by the low pressure turbine 46 through the low speed spool 30 at a lower angular speed than the low pressure turbine 46, which enables the LPC 44 to rotate at higher, more useful speeds. The axial stacking offset in a hot, running condition along the span of the airfoils 64 provides necessary compressor operation in cruise at the higher speeds enabled by the geared architecture 48, to thereby enhance aerodynamic functionality and thermal efficiency. As used herein, the hot, running condition is the condition during cruise of the gas turbine engine 20. For example, the axial stacking offset in the hot, running condition can be determined in a known manner using numerical analysis, such as finite element analysis.

Figure 5:
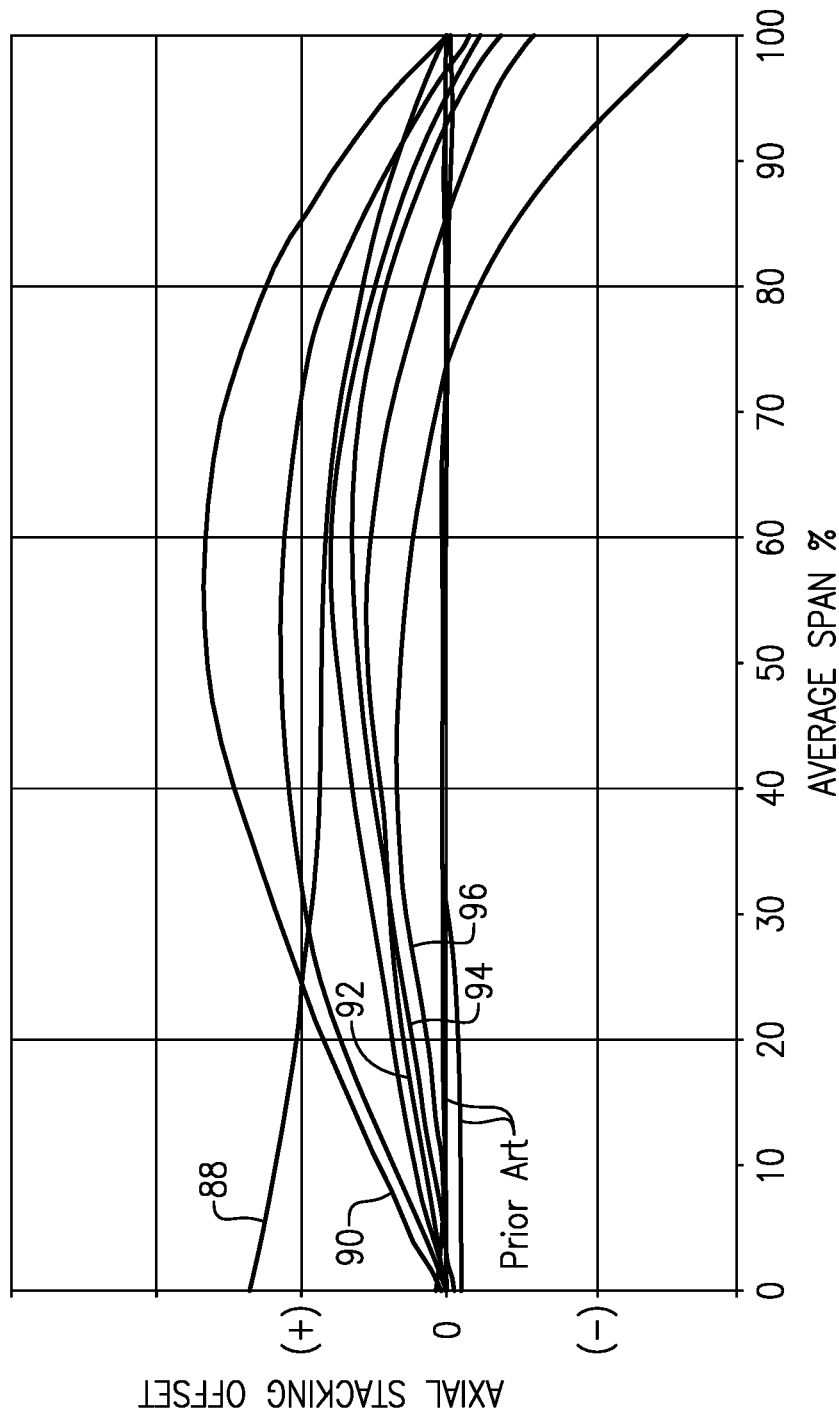
FIG. 5 graphically depicts curves for several example airfoil axial stacking offset relative to span, including two prior art curves and several inventive curves according to this disclosure.

FIG. 5 illustrates the relationship between the axial stacking offset and the average span (AVERAGE SPAN %), which is the average of the radial position at the leading and trailing edges 68, 70. The axial stacking offset assumes a center of gravity based upon a homogeneous material throughout the airfoil cross-section. In one example, the airfoils are LPC rotor blades. Two prior art curves ("PRIOR ART") are illustrated as well as several example inventive curves 88, 90, 92, 94, 96. The airfoil 64 has a relationship between an axial stacking offset and span position that includes a curve with a negative slope from 90% span to 100% span. The prior art airfoil curves are substantially linear across the entire span of the airfoil with substantially no offset. The curves 88, 90, 92, 94, 96 have a negative slope from 80% span to 100% span in the example. The curves may have a negative slope from at least 70% span to 100% span, for example.

The inventive curves 90, 92, 94, 96 have a positive slope beginning at 0% span and may extend from 0% span to at least 40% span, for example. The curves transition from the positive slope to the negative slope in a range of 40% span to 75% span, providing a maximum aftward leaning axial stacking offset in this range.

The prior art has generally used straight, axially non-stacked LPC blades. The disclosed airfoils include significant forward and aftward stacking to improve the aerodynamic efficiency of the high speed LPC blades downstream from a counter-rotating fan.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A gas turbine engine comprising:
   a combustor section arranged between a compressor section and a turbine section, wherein the compressor section includes at least a low pressure compressor and a high pressure compressor, the high pressure compressor arranged upstream of the combustor section;
   a fan section, wherein the low pressure compressor is downstream from the fan section;
   an airfoil arranged in the low pressure compressor and including pressure and suction sides extending in a radial direction from a 0% span position to a 100% span position, wherein the airfoil has an axial stacking offset defined as a distance between a center of gravity for a particular span section and a reference point, the reference point corresponding to an axial center of one of a root of the airfoil or a rotor bore, a positive axial stacking offset being on an axially aft side of the reference point and a negative axial stacking offset being on an axially forward side of the reference point; and
   wherein the axial stacking offset at a 10% span position is positive and greater than or equal to an axial stacking offset at the 100% span position, and a maximum positive axial stacking offset value of the axial stacking offset across the 0% span position to the 100% span position of the airfoil is greater than an absolute value of any negative axial stacking offset at the 100% span position.

2. The gas turbine engine according to claim 1, wherein the gas turbine engine is a two-spool configuration.

3. The gas turbine engine according to claim 1, wherein the airfoil is rotatable relative to an engine static structure.

4. The gas turbine engine according to claim 1, wherein the airfoil has a relationship between an axial stacking offset and span position that includes a curve with a negative slope from 90% to 100% span, where the negative slope leans forward relative to an engine axis.

5. The gas turbine engine according to claim 4, wherein the negative slope is from 80% span to 100% span.

6. The gas turbine engine according to claim 4, wherein the curve has a positive slope from 0% span to 40% span, where the positive slope leans aftward relative to the engine axis.

7. The gas turbine engine according to claim 6, wherein the curve transitions from the positive slope to the negative slope in a range of 40% span to 75% span.

8. The gas turbine engine according to claim 1, wherein the low pressure compressor is counter-rotating relative to the fan section.

9. The gas turbine engine according to claim 1, wherein the fan section has an array of twenty-six or fewer fan blades and a fan pressure ratio of less than 1.55.

10. An airfoil for a gas turbine engine comprising:
    a pressure side and a suction side extending in a radial direction from a 0% span position to a 100% span position and in an axial direction between a leading edge and a trailing edge;
    an axial stacking offset defined as a distance between a center of gravity for a particular span section and a reference point corresponding to an axial center of a root of the airfoil, a positive axial stacking offset being on a side of the reference point towards the trailing edge and a negative axial stacking being on a side of the reference point towards the leading edge; and
    wherein the axial stacking offset at a 10% span position is positive and greater than or equal to an axial stacking offset at the 100% span position, and a maximum positive axial stacking offset value of the axial stacking offset across the 0% span position to the 100% span position of the airfoil is greater than an absolute value of any negative axial stacking offset at the 100% span position.

11. The airfoil according to claim 10, wherein the airfoil is rotatable relative to an engine static structure.

12. The airfoil according to claim 10, wherein the airfoil has a relationship between an axial stacking offset and span position that includes a curve with a negative slope from 90% to 100% span, where the negative slope leans forward relative to an engine axis.

13. The airfoil according to claim 12, wherein the negative slope is from 80% span to 100% span.

14. The airfoil according to claim 12, wherein the curve has a positive slope from 0% span to 40% span, wherein the positive slope leans aftward.

15. The airfoil according to claim 14, wherein the curve transitions from the positive slope to the negative slope in a range of 40% span to 75% span.

16. A gas turbine engine comprising:
a combustor section arranged between a compressor section and a turbine section;
a fan section, wherein the compressor section is downstream from the fan section;
a geared architecture coupling the fan section to the turbine section;
an airfoil arranged in the compressor section and including pressure and suction sides extending in a radial direction from a 0% span position to a 100% span position, wherein the airfoil has an axial stacking offset defined as a distance between a center of gravity for a particular span section and a reference point, the reference point corresponding to an axial center of one of a root of the airfoil or a rotor bore, a positive axial stacking offset being on an axially aft side of the reference point and a negative axial stacking offset being on an axially forward side of the reference point; and
wherein the axial stacking offset at a 10% span position is positive and greater than or equal to an axial stacking offset at the 100% span position, and a maximum positive axial stacking offset value of the axial stacking offset across the 0% span position to the 100% span position of the airfoil is greater than an absolute value of any negative axial stacking offset at the 100% span position.

17. The gas turbine engine according to claim 16, wherein the geared architecture has a gear ratio greater than 2.3.

18. The gas turbine engine according to claim 16, wherein the airfoil has a relationship between an axial stacking offset and span position that includes a curve with a negative slope from 90% to 100% span, where the negative slope leans forward relative to an engine axis.

19. The gas turbine engine according to claim 18, wherein the curve has a positive slope from 0% span to 40% span and transitions from the positive slope to the negative slope in a range of 40% span to 75% span, wherein the positive slope leans aftward.

20. The gas turbine engine according to claim 16, wherein the fan section has an array of twenty-six or fewer fan blades and a fan pressure ratio of less than 1.55.

* * * * *